United States Patent
Park et al.

(10) Patent No.: US 9,783,668 B2
(45) Date of Patent: Oct. 10, 2017

(54) THERMOPLASTIC RESIN COMPOSITION AND MOLDED ARTICLE USING THE SAME

(71) Applicant: Cheil Industries Inc., Gumi-si (KR)

(72) Inventors: Ji-Eun Park, Uiwang-si (KR); Ja-Yoon Kim, Uiwang-si (KR); Kyun-Ha Ban, Uiwang-si (KR); Chang-Min Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 220 days.

(21) Appl. No.: 14/248,478

(22) Filed: Apr. 9, 2014

(65) Prior Publication Data

US 2015/0005435 A1     Jan. 1, 2015

(30) Foreign Application Priority Data

Jun. 28, 2013  (KR) .......................... 10-2013-0075885

(51) Int. Cl.
| | | |
|---|---|---|
| *C08L 25/12* | (2006.01) | |
| *C08L 51/04* | (2006.01) | |
| *C08L 51/00* | (2006.01) | |

(52) U.S. Cl.
CPC ............. *C08L 25/12* (2013.01); *C08L 51/003* (2013.01); *C08L 2205/025* (2013.01)

(58) Field of Classification Search
None
See application file for complete search history.

(56) References Cited

U.S. PATENT DOCUMENTS

| | | | |
|---|---|---|---|
| 4,409,363 A | 10/1983 | Brandstetter et al. | |
| 4,880,875 A | 11/1989 | Wassmuth et al. | |
| 4,885,335 A | 12/1989 | Gallucci et al. | |
| 5,196,480 A | 3/1993 | Seitz et al. | |
| 5,346,954 A * | 9/1994 | Wu ....................... | C08F 265/04 525/54.2 |
| 6,111,012 A | 8/2000 | Fischer et al. | |
| 6,316,527 B1 * | 11/2001 | Meyer .................... | C08L 25/12 523/201 |
| 6,512,077 B1 | 1/2003 | Miyamoto et al. | |
| 7,173,082 B2 | 2/2007 | Ahn et al. | |
| 7,514,502 B2 | 4/2009 | Kim et al. | |
| 8,367,770 B2 | 2/2013 | Ha et al. | |
| 2003/0171522 A1 * | 9/2003 | Brandenburg ........ | C08F 220/12 526/305 |
| 2005/0171297 A1 | 8/2005 | Koevoets et al. | |
| 2013/0274417 A1 * | 10/2013 | Muthulakshmi ........ | C08L 69/00 525/133 |
| 2013/0345362 A1 | 12/2013 | Maeda et al. | |
| 2015/0065652 A1 | 3/2015 | Kim et al. | |

FOREIGN PATENT DOCUMENTS

| | | |
|---|---|---|
| CN | 1346386 A | 4/2002 |
| CN | 101360770 A | 2/2009 |
| EP | 0450485 A2 | 10/1991 |
| EP | 2404941 A1 | 1/2012 |
| EP | 2692754 A1 | 2/2014 |
| KR | 10-2004-0105464 A | 12/2004 |
| KR | 10-2005-0020200 A | 3/2005 |
| KR | 10-2003-0064114 A | 4/2005 |
| KR | 10-2007-0009559 A | 1/2007 |
| KR | 10-2007-0073230 A | 7/2007 |
| KR | 10-0774821 B1 | 11/2007 |
| KR | 10-2007-0117315 A | 12/2007 |
| KR | 10-0815995 | 12/2007 |
| KR | 10-2008-0112842 A | 12/2008 |
| KR | 10-2009-0038507 A | 4/2009 |
| KR | 10-2009-0072651 A | 7/2009 |
| KR | 10-2010-0045830 A | 5/2010 |
| KR | 10-2010-0132235 A | 12/2010 |
| KR | 10-2011-0063091 A | 6/2011 |
| KR | 10-2012-0004261 A | 1/2012 |
| KR | 10-2012-0050138 A | 5/2012 |
| KR | 10-2012-0072972 A | 7/2012 |
| KR | 10-2013-0078199 A | 7/2013 |
| WO | 2012/133190 A1 | 10/2012 |

OTHER PUBLICATIONS

Search Report in counterpart European Application No. 14174715.4 dated Nov. 5, 2014, pp. 1-5.
Search Report in commonly owned Chinese Application No. 201410444312.1 dated Sep. 24, 2015, pp. 1-3.
Office Action in commonly owned U.S. Appl. No. 14/474,584 mailed Jul. 1, 2015, pp. 1-12.
Final Office Action in commonly owned U.S. Appl. No. 14/474,584 mailed Jan. 15, 2016, pp. 1-8.

* cited by examiner

*Primary Examiner* — Jeffrey Mullis
(74) *Attorney, Agent, or Firm* — Additon, Higgins & Pendleton, P.A.

(57) ABSTRACT

A thermoplastic resin composition includes (A) a first rubber-modified acrylic-based graft copolymer having an average rubber particle diameter of greater than or equal to about 100 nm and less than about 200 nm, (B) a second rubber-modified acrylic-based graft copolymer having an average rubber particle diameter of greater than or equal to about 200 nm and less than or equal to about 400 nm, (C) a first vinyl-based copolymer of an aromatic vinyl monomer and a unsaturated nitrile monomer, and (D) a second vinyl-based copolymer of an alkyl (meth)acrylate monomer, an aromatic vinyl monomer, and a unsaturated nitrile monomer. A molded article can be made using the same.

15 Claims, No Drawings

THERMOPLASTIC RESIN COMPOSITION AND MOLDED ARTICLE USING THE SAME

CROSS-REFERENCE TO RELATED APPLICATION

This application claims priority to and the benefit of Korean Patent Application No. 10-2013-0075885 filed in the Korean Intellectual Property Office on Jun. 28, 2013, the entire disclosure of which is incorporated herein by reference.

FIELD OF THE INVENTION

A thermoplastic resin composition and a molded article using the same are disclosed.

BACKGROUND OF THE INVENTION

A thermoplastic resin can have improved properties such as lower specific gravity than glass or metal and improved formability, impact resistance, and the like.

Recently, thermoplastic resins have been used to manufacture plastic products, ranging from electric/electronic products to auto parts. Thermplastic resin products can replace products manufactured using conventional glass and/or metal. This can lower costs, particularly as products become larger and lighter.

For example, an ASA resin including an acrylate-styrene-acrylonitrile copolymer has excellent properties such as weather resistance, chemical resistance, thermal stability, and the like and is widely used as a material for the manufacture of outdoor products, for example, an electric/electronic part, a building material, sport goods, auto parts, and the like.

However, the ASA resin has limited impact resistance and limited coloring properties due to non-transparent characteristics. Thus, it can be particularly difficult to use the same in the manufacture of a non-painted material.

The ASA resin may be mixed with polymethyl methacrylate to improve coloring properties. The mixture, however, can have poor impact resistance.

Accordingly, there is a need for a thermoplastic resin composition having excellent weather resistance and impact resistance and simultaneously, excellent coloring properties.

SUMMARY OF THE INVENTION

A thermoplastic resin composition that can have improved weather resistance, impact resistance, and/or coloring properties and a molded article using the same are provided.

In one embodiment of the present invention, a thermoplastic resin composition includes (A) a first rubber-modified acrylic-based graft copolymer having an average rubber particle diameter of greater than or equal to about 100 nm and less than about 200 nm, (B) a second rubber-modified acrylic-based graft copolymer having an average rubber particle diameter of greater than or equal to about 200 nm and less than or equal to about 400 nm, (C) a first vinyl-based copolymer of an aromatic vinyl monomer and a unsaturated nitrile monomer, and (D) a second vinyl-based copolymer of an alkyl (meth)acrylate monomer, an aromatic vinyl monomer, and a unsaturated nitrile monomer.

The first rubber-modified acrylic-based graft copolymer (A) may include (a1)) about 40 to about 70 wt % of an acrylic-based rubbery polymer core, and (a2) about 30 to about 60 wt % of a shell layer formed by grafting a copolymer of an aromatic vinyl monomer and unsaturated nitrile monomer on the acrylic-based rubbery polymer core.

The first rubber-modified acrylic-based graft copolymer (A) may include (a1)) an acrylic-based rubbery polymer core including (a1-1) an internal core layer consisting of a copolymer of an alkyl (meth)acrylate monomer and an aromatic vinyl monomer and (a1-2) an external core layer consisting of an alkyl (meth)acrylate-based polymer; and (a2) a shell layer formed by grafting a copolymer of an aromatic vinyl monomer and unsaturated nitrile monomer on the acrylic-based rubbery polymer core.

The first rubber-modified acrylic-based graft copolymer (A) may have a grafting ratio of about 40 to about 80%.

The second rubber-modified acrylic-based graft copolymer (B) may include (b1) about 30 to about 80 wt % of an acrylic-based rubbery polymer core and (b2) about 20 to about 70 wt % of a shell layer formed by grafting a copolymer of an aromatic vinyl monomer and unsaturated nitrile monomer on the acrylic-based rubbery polymer core.

The second rubber-modified acrylic-based graft copolymer (B) may include (b1) an acrylic-based rubbery polymer core including (b1-1) a first core layer consisting of an alkyl (meth)acrylate-based polymer, (b1-2) a second core layer consisting of a copolymer of an alkyl (meth)acrylate monomer and an aromatic vinyl monomer formed outside the first core layer, and (b1-3) a third core layer consisting of a copolymer of an alkyl (meth)acrylate monomer and an aromatic vinyl monomer formed outside the second core layer, and (b2) a shell layer formed by grafting an aromatic vinyl monomer and a unsaturated nitrile monomer on the third core layer.

The first vinyl-based copolymer (C) may include about 60 to about 70 wt % the aromatic vinyl monomer and about 30 to about 40 wt % of the unsaturated nitrile monomer.

The first vinyl-based copolymer (C) may have a weight average molecular weight of about 80,000 to about 200,000 g/mol.

The second vinyl-based copolymer (D) may include about 5 to about 30 wt % of an alkyl (meth)acrylate monomer, about 50 to about 80 wt % of an aromatic vinyl monomer, and about 10 to about 35 wt % of an unsaturated nitrile monomer.

The second vinyl-based copolymer (D) may have a weight average molecular weight of about 90,000 to about 200,000 g/mol.

The thermoplastic resin composition may include about 30 to about 50 wt % of the first rubber-modified acrylic-based graft copolymer (A) and the second rubber-modified acrylic-based graft copolymer (B), and about 50 to about 70 wt % of the first vinyl-based copolymer (C) and the second vinyl-based copolymer (D).

The thermoplastic resin composition may include about 20 to about 40 wt % of the first rubber-modified acrylic-based graft copolymer (A), about 10 to about 30 wt % of the second rubber-modified acrylic-based graft copolymer (B), about 40 to about 65 wt % of the first vinyl-based copolymer (C), and about 5 to about 30 wt % of the second vinyl-based copolymer (D).

The thermoplastic resin composition may further include a colorant.

The thermoplastic resin composition may include a black colorant, and an L value of the thermoplastic resin composition in a color coordinate of International Commission on Illumination (CIE) may be about 25 to about 29.

In one embodiment of the present invention, a molded article using the thermoplastic resin composition is provided.

The molded article may be black, and an L value of the molded article in a color coordinate of International Commission on Illumination (CIE) may be about 25 to about 29.

The thermoplastic resin composition and a molded article using the same according to one embodiment of the present invention can have improved weather resistance, impact resistance, and/or coloring properties.

DETAILED DESCRIPTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, when a definition is not otherwise provided, the term "substituted" refers to one substituted with a substituent such as a C1 to C30 alkyl group; a C1 to C10 alkylsilyl group; a C3 to C30 cycloalkyl group; a C6 to C30 aryl group; a C2 to C30 heteroaryl group; a C1 to C10 alkoxy group; a fluoro group, a C1 to C10 trifluoroalkyl group such as a trifluoromethyl group and the like; a cyano group, or a combination thereof, in place of at least one hydrogen of a compound.

As used herein, when a definition is not otherwise provided, the term "hetero" refers to one including 1 to 3 heteroatoms including N, O, S, and/or P, in place of at least one carbon atom in a compound or a substituent.

As used herein, when a definition is not otherwise provided, the term "alkyl group" refers to a "saturated alkyl group" without an alkene group or an alkyne group; or an "unsaturated alkyl group" including at least one of an alkene group and an alkyne group. The term "alkene group" refers to a substituent in which at least two carbon atoms are bound with at least one carbon-carbon double bond, and the term "alkyne group" refers to a substituent in which at least two carbon atoms are bound with at least one carbon-carbon triple bond. The alkyl group may be a branched, linear, and/or cyclic alkyl group.

The alkyl group may be a C1 to C20 alkyl group, for example a C1 to C6 lower alkyl group, a C7 to C10 middle alkyl group, or a C11 to C20 higher alkyl group.

The term "aromatic group" refers to a compound including a cyclic structure where all elements have p-orbitals which form conjugation. An aryl group and a heteroaryl group may be exemplified. The aromatic group may be a C6 to C20 aromatic group, for example, a C6 to C20 aryl group and/or a C3 to C20 heteroaryl group.

The term "aryl group" refers to a monocyclic or fused ring-containing polycyclic (i.e., rings sharing adjacent pairs of carbon atoms) groups.

The term "heteroaryl group" refers to one including 1 to 3 heteroatoms including N, O, S, and/or P in aryl group, in place of one or more carbon atoms. When the heteroaryl group is a fused ring, each ring may include 1 to 3 heteroatoms.

As used herein, when a specific definition is not otherwise provided, (meth)acrylate refers to acrylate or methacrylate and alkyl (meth)acrylate refers to alkyl acrylate or alkyl methacrylate; (meth)acrylic acid alkyl ester refers to acrylic acid alkyl ester or methacrylic acid alkyl ester, and (meth) acrylic acid ester refers to acrylic acid ester or methacrylic acid ester.

As used herein, when a definition is not otherwise provided, the "copolymerization" refers to a block copolymerization, random copolymerization, graft copolymerization, and/or alternating copolymerization, and the term "copolymer" refers to a block copolymer, random copolymer, graft copolymer, and/or alternating copolymer.

In one embodiment of the present invention, a thermoplastic resin composition includes (A) a first rubber-modified acrylic-based graft copolymer having an average rubber particle diameter of greater than or equal to about 100 nm and less than about 200 nm, (B) a second rubber-modified acrylic-based graft copolymer having an average rubber particle diameter of greater than or equal to about 200 nm and less than or equal to about 400 nm, (C) a first vinyl-based copolymer of an aromatic vinyl monomer and a unsaturated nitrile monomer, and (D) a second vinyl-based copolymer of an alkyl (meth)acrylate monomer, an aromatic vinyl monomer, and a unsaturated nitrile monomer, wherein the (A) first rubber-modified acrylic-based graft copolymer has a different average rubber particle diameter than the (B) second rubber-modified acrylic-based graft copolymer.

One example of the thermoplastic resin composition may include about 20 to about 40 wt % of the first rubber-modified acrylic-based graft copolymer (A), about 10 to about 30 wt % of the second rubber-modified acrylic-based graft copolymer (B), about 40 to about 65 wt % of the first vinyl-based copolymer (C), and about 5 to about 30 wt % of the second vinyl-based copolymer (D).

Hereinafter, each component of the thermoplastic resin composition is described in detail.

(A) First Rubber-modified Acrylic-based Graft Copolymer

The first rubber-modified acrylic-based graft copolymer (A) can have improved weather resistance and coloring properties and may have excellent impact resistance at a low temperature or room temperature.

The first rubber-modified acrylic-based graft copolymer (A) may have an average rubber particle diameter of greater than or equal to about 100 nm and less than about 200 nm. For example, the average rubber particle diameter may be greater than or equal to about 110 nm and less than about 200 nm, greater than or equal to about 120 nm and less than about 200 nm, greater than or equal to about 130 nm and less than or equal to about 200 nm, greater than or equal to about 140 nm and less than about 200 nm, or greater than or equal to about 150 nm and less than about 200 nm. Within the above range, an impact-reinforcing effect may be maximized and simultaneously coloring properties and gloss may be improved.

The first rubber-modified acrylic-based graft copolymer (A) may be a copolymer having a core-shell structure where a polymer of an aromatic vinyl monomer and a unsaturated nitrile monomer is grafted on an acrylic-based rubbery polymer core (a1) to form a shell layer (a2).

The acrylic-based rubbery polymer core (a1)) is a copolymer of a (meth)acrylic acid alkyl ester monomer and/or a (meth)acrylic acid ester monomer. As used herein, the term alkyl refers to C1 to C10 alkyl.

Examples of the (meth)acrylic acid alkyl ester monomer may include without limitation methyl (meth)acrylate, ethyl (meth)acrylate, propyl (meth)acrylate, isopropyl (meth) acrylate, butyl (meth)acrylate, t-butyl (meth)acrylate, octyl (meth)acrylate, 2-ethylhexyl (meth)acrylate, and the like, and combinations thereof. Examples of the (meth)acrylic acid ester monomer may include without limitation (meth) acrylate, and the like, and combinations thereof.

The acrylic-based rubbery polymer core (a1) may be copolymerized with one or more radical polymerizable monomers such as styrene and the like. The other radical polymerization monomers may be used in an amount of about 5 to about 30 wt %, for example about 10 to about 20 wt %, based on the total amount (total weight or 100 wt %) of the acrylic-based rubbery polymer core. In some embodiments, the acrylic-based rubbery polymer core (a1)) may include one or more radical polymerizable monomers in an amount of about 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments of the present invention, the amount of the one or more radical polymerizable monomers can be in a range from about any of the foregoing amounts to about any other of the foregoing amounts.

Examples of the aromatic vinyl monomer may include without limitation styrene, o-ethyl styrene, m-ethyl styrene, p-ethyl styrene, α-methyl styrene, o-t-butyl styrene, bromo styrene, chloro styrene, trichloro styrene, and the like, and combinations thereof.

Examples of the unsaturated nitrile monomer may include without limitation acrylonitrile, methacrylonitrile, ethacrylonitrile, and the like, and combinations thereof.

The first rubber-modified acrylic-based graft copolymer (A) may include about 40 to about 70 wt % of the acrylic-based rubbery polymer core (a1)) and about 30 to about 60 wt % of the shell layer (a2).

In some embodiments, the first rubber-modified acrylic-based graft copolymer (A) may include the acrylic-based rubbery polymer core (a1)) in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. Further, according to some embodiments of the present invention, the amount of the acrylic-based rubbery polymer core (a1)) can be in a range from about any of the foregoing amounts to about any other of the foregoing amounts.

In some embodiments, the first rubber-modified acrylic-based graft copolymer (A) may include the shell layer (a2) in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 wt %. Further, according to some embodiments of the present invention, the amount of the shell layer (a2) can be in a range from about any of the foregoing amounts to about any other of the foregoing amounts.

In this case, the thermoplastic resin composition may improve productivity but decrease generation of a solidified product and thus, sufficiently increase a grafting ratio and improve appearance characteristic, impact resistance, and coloring properties of a final molded article.

The first rubber-modified acrylic-based graft copolymer (A) may be for example a copolymer having a core-shell structure including an acrylic-based rubbery polymer core (a1) including an internal core layer consisting of a copolymer of an alkyl (meth)acrylate monomer and an aromatic vinyl monomer (a1-1) and an external core layer (a1-2) consisting of an alkyl (meth)acrylate-based polymer; and a shell layer (a2) formed by grafting a copolymer of an aromatic vinyl monomer and a unsaturated nitrile monomer on the acrylic-based rubbery polymer core (a1).

The term alkyl (meth)acrylate monomer refers to an alkyl acrylate monomer and/or an alkyl methacrylate monomer. The term alkyl refers to C1 to C10 alkyl. Examples of the alkyl (meth)acrylate monomer may include without limitation methyl (meth)acrylate, ethyl (meth)acrylate, propyl (meth)acrylate, butyl (meth)acrylate, and the like, and combinations thereof.

The aromatic vinyl monomer and unsaturated nitrile monomer are the same as described above.

The internal core layer (a1-1) includes a copolymer of an aromatic vinyl monomer and thus can improve refractive index and coloring properties of the resin.

In general, when an aromatic vinyl monomer is introduced into a core, a glass transition temperature is increased, and thus, impact strength at a low temperature is decreased. However, the first rubber-modified acrylic-based graft copolymer includes an internal core (a1-1) surrounded by an external core (a1-2), which may suppress increase of the glass transition temperature and improve the impact resistance.

The internal core layer (a1-1) may be a copolymer of about 20 to about 80 wt % of an alkyl (meth)acrylate monomer and about 80 to about 20 wt % of an aromatic vinyl monomer. For example, the internal core layer (a1-1) may be a copolymer of about 20 to about 50 wt % of an alkyl (meth)acrylate monomer and about 50 to about 80 wt % of an aromatic vinyl monomer.

In some embodiments, the internal core layer (a1-1) may be a copolymer including an alkyl (meth)acrylate monomer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the alkyl (meth)acrylate monomer can be in a range from about any of the foregoing amounts to about any other of the foregoing amounts.

In some embodiments, the internal core layer (a1-1) may be a copolymer including an aromatic vinyl monomer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the aromatic vinyl monomer can be in a range from about any of the foregoing amounts to about any other of the foregoing amounts.

In this case, the thermoplastic resin composition may ensure excellent coloring properties and/or impact resistance.

The external core layer (a1-2) consists of an alkyl (meth)acrylate-based polymer. The alkyl (meth)acrylate-based polymer may be a homopolymer or a copolymer of an alkyl (meth)acrylate monomer.

The external core layer (a1-2) uses an alkyl (meth)acrylate monomer, a grafting agent, and a cross-linking agent which are uniformly polymerized on the surface of an internal core layer and surrounds the internal core layer. Accordingly, the external core layer may suppress increase of a glass transition temperature due to the aromatic vinyl monomer in the internal core layer and simultaneously improve impact resistance and coloring properties.

The acrylic-based rubbery polymer core (a1)) may consist of about 10 to about 50 wt % of the internal core layer (a1-1) and about 50 to about 90 wt % of the external core layer (a1-2).

In some embodiments, the acrylic-based rubbery polymer core (a1)) may include the internal core layer (a1-1) in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the internal core layer (a1-1) can be in a range from about any of the foregoing amounts to about any other of the foregoing amounts.

In some embodiments, the acrylic-based rubbery polymer core (a1)) may include the external core layer (a1-2) in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the external core layer (a1-2) can be in a range from about any of the foregoing amounts to about any other of the foregoing amounts.

The acrylic-based rubbery polymer core (a1)) may have an average rubber particle diameter ranging from greater than or equal to about 100 nm to less than about 200 nm, a gel content ranging from about 85 to about 98%, and a swelling index ranging from about 10 to about 25.

The shell layer (a2) may be formed by grafting a copolymer of an aromatic vinyl monomer and an unsaturated nitrile monomer on the rubbery polymer core layer having a double structure. In this case, the thermoplastic resin composition may realize excellent impact resistance and/or coloring properties.

The aromatic vinyl monomer and the unsaturated nitrile monomer are the same as described above.

The shell layer (a2) may include about 62 to about 80 wt % of an aromatic vinyl monomer and about 20 to about 38 wt % of an unsaturated nitrile monomer.

In some embodiments, the shell layer (a2) may include the aromatic vinyl monomer in an amount of about 62, 63, 64, 65, 66, 67, 68, 69, 70, 71, 72, 73, 74, 75, 76, 77, 78, 79, or 80 wt %. Further, according to some embodiments of the present invention, the amount of the aromatic vinyl monomer can be in a range from about any of the foregoing amounts to about any other of the foregoing amounts.

In some embodiments, the shell layer (a2) may include the unsaturated nitrile monomer in an amount of about 20, 21, 22, 23, 24, 25, 26, 27, 28, 29, 30, 31, 32, 33, 34, 35, 36, 37, or 38 wt %. Further, according to some embodiments of the present invention, the amount of the unsaturated nitrile monomer can be in a range from about any of the foregoing amounts to about any other of the foregoing amounts.

When the shell layer includes aromatic vinyl monomer and unsaturated nitrile monomer in an amount within the above range, deterioration of weather resistance due to a photooxidation mechanism may be reduced or suppressed and properties such as coloring, polymerization stability, fluidity, and the like may improve.

The shell layer (a2) may have a grafting ratio ranging from about 40 to about 80%. When the shell layer (a2) has a grafting ratio within the above range, impact resistance, appearance characteristics, and/or fluidity may be improved.

The grafting ratio may be measured by the following method. A predetermined amount of the first rubber-modified acrylic-based graft copolymer (A) is put into acetone and stirred sufficiently to dissolve and then left at room temperature for 2 days, and after that, gel and solution are separated by centrifugation. At this time, the rubber phase particle is separated in gel. Then, the gel is dried in a vacuum oven having the temperature of about 50° C. for a day and the grafting ratio is calculated by the following Calculation Equation 1.

$$\text{Graft ratio (\%)} = \frac{\text{dried gel (wt \%)} - \text{rubber (wt \%)}}{\text{rubber (wt \%)}} \times 100 \quad \text{[Calculation Equation 1]}$$

In the above Calculation Equation 1, the dried gel (wt %) refers to % by weight of the dried gel based on the first rubber-modified acrylic-based graft copolymer (A), and rubber (wt %) refers to % by weight of the acrylic-based rubbery polymer core added to prepare the first rubber-modified acrylic-based graft copolymer (A).

The first rubber-modified acrylic-based graft copolymer (A) may be prepared in a method including a first step of manufacturing an acrylic-based rubbery polymer core (a1) by polymerizing an alkyl (meth)acrylate monomer and an aromatic vinyl monomer to form an internal core layer (a1-1), injecting an alkyl (meth)acrylate monomer into the internal core layer (a1-1) to form an external core layer (a1-2); and a second step of forming a shell layer (a2) by injecting a mixture of an aromatic vinyl monomer and an unsaturated nitrile monomer into the acrylic-based rubbery polymer core (a1)) to graft-polymerize them.

The thermoplastic resin composition may include the first rubber-modified acrylic-based graft copolymer (A) in an amount of about 20 to about 40 wt %, for example about 20 to about 35 wt %, and as another example about 20 to about 30 wt %, based on the total amount (total weight or 100 wt %) of the thermoplastic resin composition. In some embodiments, the thermoplastic resin composition may include the first rubber-modified acrylic-based graft copolymer (A) in an amount of about 20, 21, 22, 23, 24, 25, 26, 27, 28, 29, 30, 31, 32, 33, 34, 35, 36, 37, 38, 39, or 40 wt %. Further, according to some embodiments of the present invention, the amount of the first rubber-modified acrylic-based graft copolymer (A) can be in a range from about any of the foregoing amounts to about any other of the foregoing amounts.

(B) Second Rubber-modified Acrylic-based Graft Copolymer

The second rubber-modified acrylic-based graft copolymer (B) may be a copolymer having a core-shell structure where a polymer of an aromatic vinyl monomer and unsaturated nitrile monomer is grafted on an acrylic-based rubbery polymer core (b1) to form a shell layer (b2). However, the second rubber-modified acrylic-based graft copolymer (B) is different from the first rubber-modified acrylic-based graft copolymer (A).

The second rubber-modified acrylic-based graft copolymer (B) may have an average rubber particle diameter of greater than or equal to about 200 nm and less than or equal to about 400 nm. For example, the average rubber particle diameter may be about 220 to about 400 nm, about 240 to about 400 nm, about 260 to about 400 nm, about 280 to about 400 nm, about 300 to about 400 nm, about 200 to about 380 nm, about 200 to about 360 nm, or about 200 to about 350 nm. Within the above range, impact resistance and/or coloring properties may be improved.

The thermoplastic resin composition includes both the first rubber-modified acrylic-based graft copolymer (A) and the second rubber-modified acrylic-based graft copolymer (B), which can provide excellent appearance characteristic and/or impact resistance, simultaneously.

The acrylic-based rubbery polymer core (b1) may be a copolymer of a (meth)acrylic acid alkyl ester monomer and/or a (meth)acrylic acid ester monomer. As used herein, the term alkyl refers to C1 to C10 alkyl. Examples of the (meth)acrylic acid alkyl ester monomer may include without limitation methyl (meth)acrylate, ethyl (meth)acrylate, propyl (meth)acrylate, isopropyl (meth)acrylate, butyl (meth)acrylate, t-butyl (meth)acrylate, octyl (meth)acrylate, 2-ethylhexyl (meth)acrylate, and the like, and combinations thereof. Examples of the (meth)acrylic acid ester monomer may include without limitation (meth)acrylate, and the like, and combinations thereof.

The acrylic-based rubbery polymer core (b1) may be copolymerized with one or more radically polymerizable monomers such as styrene and the like. As used herein, the other radically polymerizable monomers may be included in an amount of about 5 to about 30 wt %, for example, about 10 to about 20 wt % based on the total amount (total weight or 100 wt %) of the acrylic-based rubbery polymer core. In some embodiments, the acrylic-based rubbery polymer core (b1) may include one or more radical polymerizable monomers in an amount of about 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments of the present invention, the amount of the one or more radical polymerizable monomers can be in a range from about any of the foregoing amounts to about any other of the foregoing amounts.

Examples of the aromatic vinyl monomer may include without limitation styrene, o-ethyl styrene, m-ethyl styrene, p-ethyl styrene, a-methyl styrene, o-t-butyl styrene, bromo styrene, chloro styrene, trichloro styrene, and the like, and combinations thereof.

Examples of the unsaturated nitrile monomer may include without limitation acrylonitrile, methacrylonitrile, ethacrylonitrile, and the like, and combinations thereof.

The second rubber-modified acrylic-based graft copolymer (B) may be for example a copolymer having a core-shell structure including an acrylic-based rubbery polymer core (b1) including an alkyl (meth)acrylate monomer and having a molecular weight of about 200,000 to about 10,000,000 g/mol; and (b2) a shell layer formed by grafting a copolymer of an aromatic vinyl monomer and a unsaturated nitrile monomer on the acrylic-based rubbery polymer core and having a molecular weight of about 50,000 to about 500,000. In this case, the second rubber-modified acrylic-based graft copolymer (B) may realize excellent fluidity and/or impact resistance.

The second rubber-modified acrylic-based graft copolymer (B) may include about 30 to about 80 wt % of the acrylic-based rubbery polymer core (b1) and about 20 to about 70 wt % of the shell layer (b2).

In some embodiments, the second rubber-modified acrylic-based graft copolymer (B) may include the acrylic-based rubbery polymer core (b1) in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the acrylic-based rubbery polymer core (b1) can be in a range from about any of the foregoing amounts to about any other of the foregoing amounts.

In some embodiments, the second rubber-modified acrylic-based graft copolymer (B) may include the shell layer (b2) in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt %. Further, according to some embodiments of the present invention, the amount of the shell layer (b2) can be in a range from about any of the foregoing amounts to about any other of the foregoing amounts.

Within the above ranges, weather resistance, low temperature impact resistance and/or dispersibility may be improved.

The second rubber-modified acrylic-based graft copolymer (B) may include, for example (b1) an acrylic-based rubbery polymer core including (b1-1) a first core layer consisting of an alkyl (meth)acrylate-based polymer, (b1-2) a second core layer consisting of a copolymer of an alkyl (meth)acrylate monomer and an aromatic vinyl monomer formed outside the first core layer, and (b1-3) a third core layer consisting of a copolymer of an alkyl (meth)acrylate monomer and an aromatic vinyl monomer formed outside the second core layer, and (b2) a shell layer formed by grafting an aromatic vinyl monomer and a unsaturated nitrile monomer on the third core layer. In this case, the second rubber-modified acrylic-based graft copolymer (B) may realize excellent impact resistance.

The first core layer (b1-1) includes an alkyl (meth)acrylate-based polymer and accordingly, may improve a refractive index and thus, coloring properties of a resin. The alkyl (meth)acrylate-based polymer may deteriorate impact strength, but since the second core layer (b1-2) and third core layer (b1-3) surround the first core layer (b1-1), a glass transition temperature may be suppressed from being increased, and thus, impact resistance may be improved.

The alkyl (meth)acrylate-based polymer, the alkyl (meth)acrylate monomer, aromatic vinyl monomer, and unsaturated nitrile monomer are the same as described above.

The acrylic-based rubbery polymer core (b1) may include about 26 to about 30 wt % of the first core layer (b1-1), about 35 to about 37 wt % of the second core layer (b1-2), and about 35 to about 37 wt % of the third core layer (b1-3).

In some embodiments, the acrylic-based rubbery polymer core (b1) may include the first core layer (b1-1) in an amount of about 26, 27, 28, 29, or 30 wt %. Further, according to some embodiments of the present invention, the amount of the first core layer (b1-1) can be in a range from about any of the foregoing amounts to about any other of the foregoing amounts.

In some embodiments, the acrylic-based rubbery polymer core (b1) may include the second core layer (b1-2) in an amount of about 35, 36, or 37 wt %. Further, according to some embodiments of the present invention, the amount of the second core layer (b1-2) can be in a range from about any of the foregoing amounts to about any other of the foregoing amounts.

In some embodiments, the acrylic-based rubbery polymer core (b1) may include the second core layer (b1-3) in an amount of about 35, 36, or 37 wt %. Further, according to some embodiments of the present invention, the amount of the second core layer (b1-3) can be in a range from about any of the foregoing amounts to about any other of the foregoing amounts.

Within the above ranges, excellent impact resistance may be realized.

One example of the second core layer (b1-2) may include about 98 to about 99 wt % of an alkyl (meth)acrylate monomer and about 1 to about 2 wt % of an aromatic vinyl monomer.

In some embodiments, the second core layer (b1-2) may include an alkyl (meth)acrylate monomer in an amount of about 98 or 99 wt %. Further, according to some embodiments of the present invention, the amount of the alkyl (meth)acrylate monomer can be in a range from about any of the foregoing amounts to about any other of the foregoing amounts.

In some embodiments, the second core layer (b1-2) may include an aromatic vinyl monomer in an amount of about 1 or 2 wt %. Further, according to some embodiments of the present invention, the amount of the aromatic vinyl monomer can be in a range from about any of the foregoing amounts to about any other of the foregoing amounts.

Within the above ranges, impact resistance and/or coloring properties may be improved.

The third core layer (b1-3) may include about 97 to about 98 wt % of an alkyl(meth)acrylate monomer and about 2 to about 3 wt % of an aromatic vinyl monomer.

In some embodiments, the third core layer (b1-3) may include an alkyl (meth)acrylate monomer in an amount of about 97 or 98 wt %. Further, according to some embodiments of the present invention, the amount of the alkyl (meth)acrylate monomer can be in a range from about any of the foregoing amounts to about any other of the foregoing amounts.

In some embodiments, the third core layer (b1-3) may include an aromatic vinyl monomer in an amount of about 2 or 3 wt %. Further, according to some embodiments of the present invention, the amount of the aromatic vinyl monomer can be in a range from about any of the foregoing amounts to about any other of the foregoing amounts.

When the third core layer (b1-3) is included in an amount within the above range, a binding force between the core layer and the shell layer may be increased, and thus, impact resistance and/or coloring properties may be improved.

The second core layer (b1-2) and the third core layer (b1-3) may further include a cross-linking agent. The second core layer (b1-2) and/or the third core layer (b1-3) may include the cross-linking agent in an amount of about 0.5 to about 1.5 parts by weight based on about 100 parts by weight of the alkyl (meth)acrylate monomer included in the acrylic-based rubbery polymer core (b1). The cross-linking agent may increase a bond between the second and third core layers.

The acrylic-based rubbery polymer core (b1) may have an average rubber particle diameter of greater than or equal to about 200 nm and less than or equal to about 400 nm and a gel content of about 80 to about 85 wt %.

The acrylic-based rubbery polymer core (b1) may have gradually increasing cross-linking density in an order of the first core layer (b1-1), the second core layer (b1-2), and the third core layer (b1-3). In this case, the second rubber-modified acrylic-based graft copolymer (B) may realize excellent impact resistance.

A rubber particle diameter distribution of the acrylic-based rubbery polymer core (b1) may be bimodal or trimodal.

The shell layer (b2) may include about 20 to about 90 wt % of an aromatic vinyl monomer and about 10 to about 80 wt % of an unsaturated nitrile monomer.

In some embodiments, the shell layer (b2) may include the aromatic vinyl monomer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the aromatic vinyl monomer can be in a range from about any of the foregoing amounts to about any other of the foregoing amounts.

In some embodiments, the shell layer (b2) may include the unsaturated nitrile monomer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the unsaturated nitrile monomer can be in a range from about any of the foregoing amounts to about any other of the foregoing amounts.

In this case, compatibility of the first vinyl-based copolymer (B), the first vinyl-based copolymer (C) and the second vinyl-based copolymer (D) may be improved.

A grafting ratio of the shell layer (b2) may be about 70 to about 90%. Herein, impact resistance, appearance characteristics, and fluidity may be improved.

The thermoplastic resin composition may include the second rubber-modified acrylic-based graft copolymer (B) in an amount of about 10 to about 30 wt %, for example about 10 to about 25 wt %, and as another example about 10 to about 20 wt %, based on the total amount (total weight or 100 wt %) of the thermoplastic resin composition. In some embodiments, the thermoplastic resin composition may include the second rubber-modified acrylic-based graft copolymer (B) in an amount of about 10, 11, 12, 13, 14, 15, 16, 17, 18, 19, 20, 21, 22, 23, 24, 25, 26, 27, 28, 29, or 30 wt %. Further, according to some embodiments of the present invention, the amount of the first rubber-modified acrylic-based graft copolymer (B) can be in a range from about any of the foregoing amounts to about any other of the foregoing amounts.

The thermoplastic resin composition may include the first rubber-modified acrylic-based graft copolymer (A) and the second rubber-modified acrylic-based graft copolymer (B) in an amount of about 30 to about 50 wt %, for example about 35 to about 50 wt %, and as another example about 30 to about 45 wt %, based on the total amount (total weight or 100 wt %) of the thermoplastic resin composition.

In some embodiments, the thermoplastic resin composition may include the first rubber-modified acrylic-based graft copolymer (A) and the second rubber-modified acrylic-based graft copolymer (B) in an amount of about 30, 31, 32, 33, 34, 35, 36, 37, 38, 39, 40, 41, 42, 43, 44, 45, 46, 47, 48, 49, or 50 wt %. Further, according to some embodiments of the present invention, the amount of the first rubber-modified acrylic-based graft copolymer (A) and the second rubber-modified acrylic-based graft copolymer (B) can be in a range from about any of the foregoing amounts to about any other of the foregoing amounts.

In this case, the thermoplastic resin composition may ensure excellent weather resistance, impact resistance, and/or coloring properties.

(C) First Vinyl-based Copolymer

The first vinyl-based copolymer is a copolymer of an aromatic vinyl monomer and an unsaturated nitrile monomer. The thermoplastic resin composition may have improved weather resistance and impact resistance due to the first vinyl-based copolymer.

Examples of the aromatic vinyl monomer may include without limitation styrene, o-ethyl styrene, m-ethyl styrene, p-ethyl styrene, a-methyl styrene, o-t-butyl styrene, bromo styrene, chloro styrene, trichloro styrene, and the like, and combinations thereof.

Examples of the unsaturated nitrile monomer may include without limitation acrylonitrile, methacrylonitrile, ethacrylonitrile, and the like, and combinations thereof.

The first vinyl-based copolymer (C) may include about 60 to about 70 wt % of the aromatic vinyl monomer and about 30 to about 40 wt % of the unsaturated nitrile monomer.

In some embodiments, the first vinyl-based copolymer (C) may include an aromatic vinyl monomer in an amount of about 60, 61, 62, 63, 64, 65, 66, 67, 68, 69, or 70 wt %. Further, according to some embodiments of the present invention, the amount of the aromatic vinyl monomer can be in a range from about any of the foregoing amounts to about any other of the foregoing amounts.

In some embodiments, the first vinyl-based copolymer (C) may include an unsaturated nitrile monomer in an amount of about 30, 31, 32, 33, 34, 35, 36, 37, 38, 39, or 40 wt %. Further, according to some embodiments of the present invention, the amount of the unsaturated nitrile monomer can be in a range from about any of the foregoing amounts to about any other of the foregoing amounts.

When the first vinyl-based copolymer (C) is included in an amount within the above range, thermal discoloring may be suppressed, and thus, chemical resistance may be improved.

The first vinyl-based copolymer (C) may have a weight average molecular weight of about 80,000 to about 200,000 g/mol, for example about 85,000 to about 120,000 g/mol. When the first vinyl-based copolymer (C) has a weight average molecular weight within the above range, molding properties may be improved by securing excellent fluidity.

The thermoplastic resin composition may include the first vinyl-based copolymer (C) in an amount of about 40 to about 65 wt %, for example about 40 to about 60 wt %, based on the total amount (total weight or 100 wt %) of the thermoplastic resin composition. In some embodiments, the thermoplastic resin composition may include the first vinyl-based copolymer (C) in an amount of about 40, 41, 42, 43, 44, 45, 46, 47, 48, 49, 50, 51, 52, 53, 54, 55, 56, 57, 58, 59, 60, 61, 62, 63, 64, or 65 wt %. Further, according to some embodiments of the present invention, the amount of the first vinyl-based copolymer (C) can be in a range from about any of the foregoing amounts to about any other of the foregoing amounts.

When the first vinyl-based copolymer (C) is used in an amount within the above range, the thermoplastic resin composition may exhibit excellent weather resistance, impact resistance, and/or coloring properties.

(D) Second Vinyl-based Copolymer

The second vinyl-based copolymer is a copolymer of an alkyl (meth)acrylate monomer, an aromatic vinyl monomer, and an unsaturated nitrile monomer. The thermoplastic resin composition may have improved coloring properties due to the second vinyl-based copolymer.

The term alkyl (meth)acrylate monomer refers to an alkyl acrylate monomer and/or an alkyl methacrylate monomer. The term alkyl refers to C1 to C10 alkyl. Examples of the alkyl (meth)acrylate monomer may include without limitation methyl (meth)acrylate, ethyl (meth)acrylate, propyl (meth)acrylate, isopropyl (meth)acrylate, butyl (meth)acrylate, t-butyl (meth)acrylate, octyl (meth)acrylate, 2-ethylhexyl (meth)acrylate, and the like, and combinations thereof.

Examples of the aromatic vinyl monomer may include without limitation styrene, o-ethyl styrene, m-ethyl styrene, p-ethyl styrene, a-methyl styrene, o-t-butyl styrene, bromo styrene, chloro styrene, trichloro styrene, and the like, and combinations thereof.

Examples of the unsaturated nitrile monomer may include without limitation acrylonitrile, methacrylonitrile, ethacrylonitrile, and the like, and combinations thereof.

The second vinyl-based copolymer (D) may include about 5 to about 30 wt % of the alkyl (meth)acrylate monomer, about 50 to about 80 wt % of the aromatic vinyl monomer, and about 10 to about 35 wt % of the unsaturated nitrile monomer.

In some embodiments, the second vinyl-based copolymer (D) may include an alkyl (meth)acrylate monomer in an amount of about 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments of the present invention, the amount of the alkyl (meth)acrylate monomer can be in a range from about any of the foregoing amounts to about any other of the foregoing amounts.

In some embodiments, the second vinyl-based copolymer (D) may include an aromatic vinyl monomer in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the aromatic vinyl monomer can be in a range from about any of the foregoing amounts to about any other of the foregoing amounts.

In some embodiments, the second vinyl-based copolymer (D) may include an unsaturated nitrile monomer in an amount of about 10, 11, 12, 13, 14, 15, 16, 17, 18, 19, 20, 21, 22, 23, 24, 25, 26, 27, 28, 29, 30, 31, 32, 33, 34, or 35 wt %. Further, according to some embodiments of the present invention, the amount of the unsaturated nitrile monomer can be in a range from about any of the foregoing amounts to about any other of the foregoing amounts.

In this case, the second vinyl-based copolymer may provide excellent coloring properties.

The second vinyl-based copolymer (D) may have a weight average molecular weight of about 90,000 to about 200,000 g/mol.

The second vinyl-based copolymer (D) has a similar refractive index to an average refractive index of the first rubber-modified acrylic-based graft copolymer (A) and the second rubber-modified acrylic-based graft copolymer (B). Accordingly, a thermoplastic resin composition including these copolymers may have excellent transparency and thus can exhibit excellent coloring properties.

Specifically, the difference between an average refractive index of the first rubber-modified acrylic-based graft copolymer (A) and the second rubber-modified acrylic-based graft copolymer (B) and a refractive index of the second vinyl-based copolymer (D) may be about 0.001 to about 0.02.

The thermoplastic resin composition may include the second vinyl-based copolymer (D) in an amount of about 5 to about 30 wt %, for example about 5 to about 25 wt %, based on the total amount (total weight or 100 wt %) of the thermoplastic resin composition. In some embodiments, the thermoplastic resin composition may include the second vinyl-based copolymer (D) in an amount of about 5, 6, 7, 8, 9, 10, 11, 12, 13, 14, 15, 16, 17, 18, 19, 20, 21, 22, 23, 24, 25, 26, 27, 28, 29, or 30 wt %. Further, according to some embodiments of the present invention, the amount of the second vinyl-based copolymer (D) can be in a range from about any of the foregoing amounts to about any other of the foregoing amounts.

The thermoplastic resin composition may include the first vinyl-based copolymer (C) and the second vinyl-based copolymer (D) in an amount of about 50 to about 70 wt %, for example about 55 to about 70 wt %, and as another example about 50 to about 65 wt %, based on the total amount (total weight or 100 wt %) of the thermoplastic resin composition. In some embodiments, the thermoplastic resin composition may include the first vinyl-based copolymer (C) and the second vinyl-based copolymer (D) in an amount of about 50, 51, 52, 53, 54, 55, 56, 57, 58, 59, 60, 61, 62, 63, 64, 65, 66, 67, 68, 69, or 70 wt %. Further, according to some embodiments of the present invention, the amount of the first vinyl-based copolymer (C) and the second vinyl-based copolymer (D) can be in a range from about any of the foregoing amounts to about any other of the foregoing amounts.

In this case, the thermoplastic resin composition may exhibit excellent weather resistance, impact resistance, and/or coloring properties.

(E) Colorant

The thermoplastic resin composition may further include a colorant.

The colorant may be a dye, a pigment, or a combination thereof.

The colorant may include carbon black. The carbon black is a black colorant prepared by combusting or thermally decomposing a compound including carbon insufficiently having oxygen. The carbon black may have a particle diameter ranging from about 1 to about 500 nm, for example, about 1 to about 100 nm.

The colorant may play a role of expressing a color in the thermoplastic resin composition.

The colorant may include a carbon black master batch. The carbon black master batch can be prepared by adding an additive such as carbon black, a thermoplastic resin, a lubricant, and the like thereto. The thermoplastic resin may be a copolymer of an aromatic vinyl monomer and an unsaturated nitrile monomer. The aromatic vinyl monomer and the unsaturated nitrile monomer are the same as illustrated above.

(F) Other Additive(s)

The thermoplastic resin composition may further include one or more kinds of other additives, for example to balance properties and/or to provide properties based on use of the final product. Examples of the other additives may include without limitation flame retardants, surfactants, nucleating agents, coupling agents, filler, plasticizers, impact-reinforcing agents, lubricants, antibacterial agents, release agents, antioxidants, inorganic material additives, anti-static agents, flame proofing agents, heat stabilizers, ultraviolet (UV) absorbers, ultraviolet (UV) blocking agents, adhesives, and the like, and may be used singularly or in a combination of two or more.

The other additive may be included in a predetermined amount as long as it does not deteriorate the properties of the resin composition. In exemplary embodiments, the additive(s) may be included in an amount of less than or equal to about 40 parts by weight, for example about 0.1 to about 30 parts by weight, based on about 100 parts by weight of the thermoplastic resin composition.

The above thermoplastic resin composition may be prepared by any well-known method of preparing a resin composition. For example, each component according to one embodiment of the present invention can be simultaneously mixed, optionally with one or more other additives. The mixture can be melt-extruded and prepared in the form of pellets.

According to another embodiment of the present invention, a molded article manufactured using the thermoplastic resin composition is provided.

The molded article may be manufactured by various processes such as injection-molding, blow molding, extrusion molding, thermal molding, and the like, using the thermoplastic resin composition.

The molded article may exhibit improved weather resistance as well as improved mechanical properties such as impact resistance and the like and heat resistance and thus, may be used in the manufacture of various outdoor electric/electronic parts, building materials, sport goods, auto parts, and the like.

The molded article can exhibit excellent weather resistance, impact resistance, and/or coloring properties.

In exemplary embodiments, the molded article may have an Izod impact strength ranging from about 8 to about 30 kgf·cm/cm. This shows that the molded article has excellent impact resistance. The Izod Impact strength is measured by making a notch in a ⅛" Izod specimen according to an evaluation method based on ASTM D256.

The molded article may be black, and an L value of the molded article in a color coordinate of International Commission on Illumination (CIE) may be about 25 to about 29.

The L value indicates brightness in CIE color coordinate. As the L values increases, brightness becomes higher. In other words, as a black molded article has a lower L value, coloring properties of black, that is, a degree of blackness is more excellent. When the black molded article has an L value ranging from greater than or equal to about 25 and less than or equal to about 29, the molded article has a high degree of blackness. On the other hand, the L value is measure by using a spectrophotometer with a reference to SCI (specular component included).

Hereinafter, the present invention is illustrated in more detail with reference to the following examples and comparative examples. However, the following examples and comparative examples are provided for the purpose of illustration only and the present invention is not limited thereto.

EXAMPLES 1 TO 3 AND COMPARATIVE EXAMPLES 1 TO 5

Pellet-shaped resin compositions are prepared by mixing the components in the amounts provided in the following Table 1 and then extruding and processing the resultant mixtures to prepare resin compositions in a form of pellets. The mixtures are extruded using a twin-screw extruder having L/D=29 and a diameter of 45 mm and setting a barrel temperature at 220° C.

TABLE 1

|  | Examples | | | Comparative Examples | | | | |
| --- | --- | --- | --- | --- | --- | --- | --- | --- |
|  | 1 | 2 | 3 | 1 | 2 | 3 | 4 | 5 |
| (A) first rubber-modified acrylic-based graft copolymer | 24 | 24 | 24 | 24 | 24 | 24 | 24 | 24 |
| (B) second rubber-modified acrylic-based graft copolymer | 17 | 17 | 17 | 17 | 17 | 17 | 17 | 17 |

TABLE 1-continued

|  |  | Examples | | | Comparative Examples | | | | |
| --- | --- | --- | --- | --- | --- | --- | --- | --- | --- |
|  |  | 1 | 2 | 3 | 1 | 2 | 3 | 4 | 5 |
| (C) first vinyl-based | (C-1) | 54 | 44 | 44 | 44 | 49 | 44 |  | 44 |
| copolymer | (C-2) |  |  |  | 15 |  |  | 44 |  |
| (D) second vinyl-based copolymer |  | 5 | 15 | 15 |  |  |  |  |  |
| (D') polymethyl methacrylate |  |  |  |  |  | 10 | 15 | 15 | 15 |
| (E) colorant | (E-1) | 2.25 | 2.25 |  | 2.25 | 2.25 | 2.25 | 2.25 |  |
|  | (E-2) |  |  | 5.0 |  |  |  |  | 5.0 |

In Table 1, the units of the amounts of (A) to (D') used are wt %, and the unit of the amount of (E) is parts by weight based on the total weight of the (A) to (D').

Each component in Table 1 is described as follows.

(A) First Rubber-modified Acrylic-based Graft Copolymer

A butyl acrylate-styrene-acrylonitrile graft copolymer (Cheil Industries Inc.) having a core-shell structure including an acrylic-based rubbery polymer core consisting of a butyl acrylate-styrene copolymer internal core layer and a butyl acrylate external core layer and a shell layer formed of a styrene-acrylonitrile copolymer on the core, having an average rubber particle diameter of 170 nm and including 50 wt % of a rubbery polymer core and having 70% of a grafting ratio is used.

(B) Second Rubber-modified Acrylic-based Graft Copolymer

A butyl acrylate-styrene-acrylonitrile graft copolymer (Cheil Industries Inc.) having a core-shell structure including an acrylic-based rubbery polymer core consisting of a first core layer formed of a butyl acrylate rubbery polymer, a second core layer formed of a butyl acrylate-styrene copolymer, and a third core layer formed of a butyl acrylate-styrene copolymer having a higher cross-linking density than the second core layer and a shell layer formed of a styrene-acrylonitrile copolymer on the core, having an average rubber particle diameter of 320 nm, and including a rubbery polymer core of 60 wt % and having a grafting ratio of 85% is used.

(C) First Vinyl-based Copolymer (C-1) A styrene-acrylonitrile copolymer resin (Cheil Industries Inc.) prepared by using 66 wt % of styrene and 34 wt % of acrylonitrile in a conventional suspension polymerization method and having a weight average molecular weight of 85,000 g/mol is used.

(C-2) A styrene-acrylonitrile copolymer resin (Cheil Industries Inc.) prepared by using 68 wt % of styrene and 32 wt % of acrylonitrile in a conventional suspension polymerization method and having a weight average molecular weight of 120,000 g/mol is used.

(D) Second Vinyl-based Copolymer

A methyl methacrylate-styrene-acrylonitrile copolymer resin (Cheil Industries Inc.) prepared by using methyl methacrylate of 15 wt %, styrene of 65 wt %, and acrylonitrile of 20 wt % in a conventional suspension polymerization method and having a weight average molecular weight of 100,000 g/mol is used.

(D') Polymethyl Methacrylate

Polymethyl methacrylate (PM-7200, Cheil Industries Inc.) having a weight average molecular weight of 90,000 g/mol is used.

(E) Colorant (E-1) Carbon black (HIBLACK 50L, Orion Engineered Carbons LLC) having an average particle diameter of 18 nm is used.

(E-2) A carbon black master batch prepared by mixing 45 wt % of carbon black (HIBLACK 50L, Orion Engineered Carbons LLC) in a styrene-acrylonitrile copolymer resin is used.

EVALUATION EXAMPLES 1 to 3

The obtained pellets are dried at 80° C. for 2 hours and manufactured into each specimen having a size of 9 cm×5 cm×0.2 cm by using a 6 oz injection molding machine and setting a cylinder temperature at 250° C. and a molding temperature at 60° C. Properties of the specimens are measured using the following methods, and the results are provided in the following Table 2.

EVALUATION EXAMPLE 1

Izod Impact strength

⅛" Izod impact strength is measured in accordance with ASTM D256 by making a notch. (unit: kgf·cm/cm)

EVALUATION EXAMPLE 2

Charpy Impact strength

Charpy impact strength is measured in accordance with ISO 179 eA. (unit: kgf·cm/cm)

EVALUATION EXAMPLE 3

Coloring Properties (L value)

An L value is measured with a reference to SCI by using a spectrophotometer (CM-3500d, Konica Minolta Inc.).

TABLE 2

|  | Examples | | | Comparative Examples | | | | |
| --- | --- | --- | --- | --- | --- | --- | --- | --- |
|  | 1 | 2 | 3 | 1 | 2 | 3 | 4 | 5 |
| Izod Impact strength | 15 | 12 | 16 | 18 | 8 | 5 | 7 | 10 |
| Charpy Impact strength | 8 | 6 | 12 | 13 | 5 | 4 | 5 | 7 |
| Coloring properties (L value) | 28.7 | 27.8 | 27.9 | 29.2 | 28.2 | 27.3 | 28.0 | 28.2 |

Referring to Table 2, Comparative Example 1 including no second vinyl-based copolymer (D) exhibits excellent impact strength but insufficient coloring properties. In addition, Comparative Examples 2 to 5 including polymethyl methacrylate (D') instead of the second vinyl-based copolymer (D) exhibit excellent coloring properties but very insufficient Impact strength.

In contrast, Examples 1 to 3 exhibit Izod Impact strength ranging from 12 to 16 kgf·cm/cm, Charpy impact strength ranging from 6 to 12 kgf·cm/cm, and a L value ranging from 27.8 to 28.7 in a CIE color system and thus, excellent impact strength and coloring properties.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:

1. A thermoplastic resin composition, comprising:
   (A) a first rubber-modified acrylic-based graft copolymer having a volume average rubber particle diameter of greater than or equal to about 100 nm and less than about 200 nm, wherein the first rubber-modified acrylic-based graft copolymer (A) comprises:
   (a1) an acrylic-based rubbery polymer core comprising (a1-1) an internal core layer consisting of a copolymer of an alkyl (meth)acrylate monomer and an aromatic vinyl monomer and (a1-2) an external core layer consisting of an alkyl (meth)acrylate-based polymer; and
   (a2) a shell layer formed by grafting a copolymer of an aromatic vinyl monomer and unsaturated nitrile monomer on the acrylic-based rubbery polymer core,
   (B) a second rubber-modified acrylic-based graft copolymer having a volume average rubber particle diameter of greater than or equal to about 200 nm and less than or equal to about 400 nm,
   (C) a first vinyl-based copolymer of an aromatic vinyl monomer and a unsaturated nitrile monomer, and
   (D) about 5 to about 30 wt % based on the total amount of (A), (B), (C) and (D) of a second vinyl-based copolymer comprising about 5 to about 30 wt % of an alkyl (meth)acrylate monomer, about 50 to about 80 wt % of an aromatic vinyl monomer, and about 10 to about 35 wt % of an unsaturated nitrile monomer,
   wherein the difference between an average refractive index of the first rubber-modified acrylic-based graft copolymer (A) and the second rubber-modified acrylic-based graft copolymer (B) and a refractive index of the second vinyl-based copolymer (D) is about 0.001 to about 0.02.

2. The thermoplastic resin composition of claim 1, wherein the first rubber-modified acrylic-based graft copolymer (A) comprises:
   (a1) about 40 to about 70 wt % of the acrylic-based rubbery polymer core, and
   (a2) about 30 to about 60 wt % of the shell layer.

3. The thermoplastic resin composition of claim 1, wherein the first rubber-modified acrylic-based graft copolymer (A) has a grafting ratio of about 40 to about 80%.

4. The thermoplastic resin composition of claim 1, wherein the second rubber-modified acrylic-based graft copolymer (B) comprises:
   (b1) about 30 to about 80 wt % of an acrylic-based rubbery polymer core and
   (b2) about 20 to about 70 wt % of a shell layer formed by grafting a copolymer of an aromatic vinyl monomer and unsaturated nitrile monomer on the acrylic-based rubbery polymer core.

5. The thermoplastic resin composition of claim 1, wherein the second rubber-modified acrylic-based graft copolymer (B) comprises:
   (b1) an acrylic-based rubbery polymer core comprising:
   (b1-1) a first core layer consisting of an alkyl (meth) acrylate-based polymer,
   (b1-2) a second core layer consisting of a copolymer of an alkyl (meth)acrylate monomer and an aromatic vinyl monomer formed outside the first core layer, and
   (b1-3) a third core layer consisting of a copolymer of an alkyl (meth)acrylate monomer and an aromatic vinyl monomer formed outside the second core layer, and
   (b2) a shell layer formed by grafting an aromatic vinyl monomer and a unsaturated nitrile monomer on the third core layer.

6. The thermoplastic resin composition of claim 1, wherein the first vinyl-based copolymer (C) comprises:
   about 60 to about 70 wt % the aromatic vinyl monomer, and
   about 30 to about 40 wt % of the unsaturated nitrile monomer.

7. The thermoplastic resin composition of claim 1, wherein the first vinyl-based copolymer (C) has a weight average molecular weight of about 80,000 to about 200,000 g/mol.

8. The thermoplastic resin composition of claim 1, wherein the second vinyl-based copolymer (D) has a weight average molecular weight of about 90,000 to about 200,000 g/mol.

9. The thermoplastic resin composition of claim 1, wherein the thermoplastic resin composition comprises:
   about 30 to about 50 wt % of the first rubber-modified acrylic-based graft copolymer (A) and the second rubber-modified acrylic-based graft copolymer (B) based on the total amount of (A), (B), (C), and (D), and
   about 50 to about 70 wt % of the first vinyl-based copolymer (C) and the second vinyl-based copolymer (D) based on the total amount of (A), (B), (C), and (D).

10. The thermoplastic resin composition of claim 1, wherein the thermoplastic resin composition comprises:
    about 20 to about 40 wt % of the first rubber-modified acrylic-based graft copolymer (A),
    about 10 to about 30 wt % of the second rubber-modified acrylic-based graft copolymer (B), and
    about 40 to about 65 wt % of the first vinyl-based copolymer (C),
    each based on the total amount of (A), (B), (C), and (D).

11. The thermoplastic resin composition of claim 1, wherein the thermoplastic resin composition further comprises a colorant (E).

12. The thermoplastic resin composition of claim 11, wherein the colorant (E) comprises carbon black, carbon black master batch, or a combination thereof.

13. A molded article using the thermoplastic resin composition of claim 1.

14. The molded article of claim 13, wherein the molded article is black, and
    an L value of the molded article in a color coordinate of International Commission on Illumination (CIE) is about 25 to about 29.

15. A thermoplastic resin composition, comprising:
    (A) a first rubber-modified acrylic-based graft copolymer having a volume average rubber particle diameter of greater than or equal to about 100 nm and less than about 200 nm, wherein the first rubber-modified acrylic-based graft copolymer (A) comprises:

(a1) an acrylic-based rubbery polymer core comprising (a1-1) an internal core layer consisting of a copolymer of an alkyl (meth)acrylate monomer and an aromatic vinyl monomer and (a1-2) an external core layer consisting of an alkyl (meth)acrylate-based polymer; and (a2) a shell layer formed by grafting a copolymer of an aromatic vinyl monomer and unsaturated nitrile monomer on the acrylic-based rubbery polymer core, (B) a second rubber-modified acrylic-based graft copolymer having a volume average rubber particle diameter of greater than or equal to about 200 nm and less than or equal to about 400 nm, (C) a first vinyl-based copolymer of an aromatic vinyl monomer and a unsaturated nitrile monomer, and (D) about 5 to about 30 wt % based on the total amount of (A), (B), (C) and (D) of a second vinyl-based copolymer comprising about 5 to about 30 wt % of an alkyl (meth)acrylate monomer, about 50 to about 80 wt % of an aromatic vinyl monomer, and about 10 to about 35 wt % of an unsaturated nitrile monomer.

* * * * *

UNITED STATES PATENT AND TRADEMARK OFFICE
CERTIFICATE OF CORRECTION

PATENT NO. : 9,783,668 B2
APPLICATION NO. : 14/248478
DATED : October 10, 2017
INVENTOR(S) : Ji-Eun Park et al.

It is certified that error appears in the above-identified patent and that said Letters Patent is hereby corrected as shown below:

In the Specification

Column 5, delete Line 8 and insert: -- ments, the acrylic-based rubbery polymer core (a1) may --

Column 5, delete Line 28 and insert: -- based rubbery polymer core (a1) and about 30 to about 60 --

Column 5, delete Line 32 and insert: -- rubbery polymer core (a1) in an amount of about 40, 41, 42, --

Column 6, delete Line 65 and insert: -- core (a1) may include the internal core layer (a1-1 in an --

Column 7, delete Line 7 and insert: -- core (a1) may include the external core layer (a1-2 in an --

Column 7, delete Line 15 and insert: -- The acrylic-based rubbery polymer core (a1) may have --

Column 8, delete Line 24 and insert: -- polymer core (a1) to graft-polymerize them. --

Column 9, delete Line 28 and insert: -- p-ethyl styrene, α-methyl styrene, o-t-butyl styrene, bromo --

Column 12, delete Line 62 and insert: -- p-ethyl styrene, α-methyl styrene, o-t-butyl styrene, bromo --

Column 13, delete Line 62 and insert: -- p-ethyl styrene, α-methyl styrene, o-t-butyl styrene, bromo --

Signed and Sealed this
Third Day of April, 2018

Andrei Iancu
*Director of the United States Patent and Trademark Office*